United States Patent Office 3,003,237
Patented Oct. 10, 1961

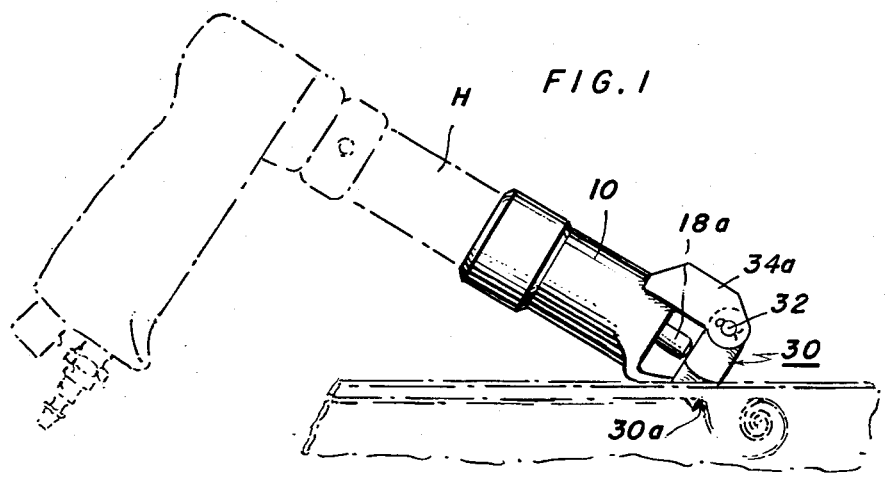
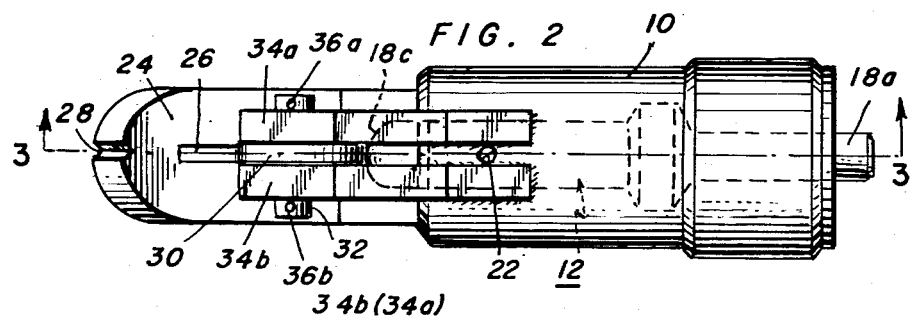
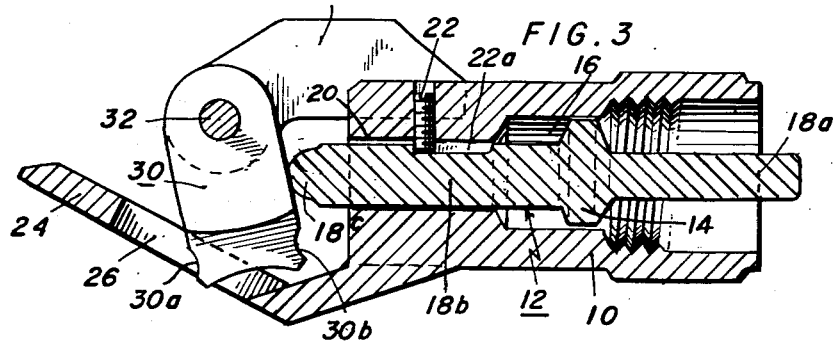
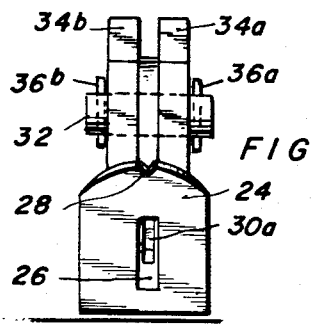
INVENTOR
CLARK CHANDLER
ATTORNEY

3,003,237
POWER TOOLS
Clark Chandler, 3600 W. 15th St., Panama City, Fla.
Filed Jan. 5, 1960, Ser. No. 612
8 Claims. (Cl. 30—277)

This invention relates to improvements in power tools, and more particularly to an improved power-operated sheet-metal cutting tool of the type commonly known as a panel cutter, which is designed primarily for automobile body work but which of course may be used for cutting metal sheets and panels regardless of where or how used.

Among the objects of the present invention may be noted the provision of a novel, practical and thoroughly dependable sheet-metal cutting tool that will work on any of the conventional impact hammers, either air or electric; the provision of a power-hammer operated cutting tool as aforesaid employing a pivoted cutting blade, as distinguished principally from the chisel-type cutting blades employed in the conventional hammer- or gun-type sheet-metal cutting tools; the provision of an impact-hammer-operated cutting tool for sheet-metal and panel work employing a reversible double-edge cutting blade giving the advantage of doubling the life of the blade and/or of protecting the owner of the tool against the latter being put out of service in the event one cutting edge of the blade is broken or dulled, for example; the provision of a impact-hammer-operated cutting tool employing a reversible, double-edged pivoted cutting blade as aforesaid, whose construction and arrangement are such that said blade is readily accessible for reversal as and when necessary; the provision of a novel and improved impact-hammer-operated sheet-metal cutting tool whose construction and arrangement, as well as mode of operation, are such that the operator of the tool is always in complete control thereof and needs only to guide the tool as it makes a cut and is further protected from the scrap by the workpiece being cut.

The above and other objects and features of advantage of the improved sheet-metal cutting tool of the present invention will be apparent from the following detailed description thereof, in which reference is had to the accompanying drawings, wherein . . .

FIG. 1 is a somewhat diagrammatic perspective view of my improved sheet-metal cutting tool, which depicts its manner of operation and the way in which the scrap curls below the workpiece, rather than upwardly from the workpiece as is customary;

FIG. 2 is a top plan view of the cutting tool illustrated in FIG. 1, removed from the impact hammer which powers the same;

FIG. 3 is a section taken on line 3—3 of FIG. 2; and

FIG. 4 is an end elevation of the cutting tool, as the latter is viewed from the left in FIG. 3.

Referring to the drawings in detail, a sheet-metal cutting tool according to the present invention comprises a tubular body member or housing 10 having an open end which is internally threaded so as to threadingly receive the externally threaded barrel of an impact hammer H shown in broken lines, FIG. 1. Mounted for reciprocatory motion within said body member 10 is a plunger generally designated 12 having a piston-like intermediate portion 14 operating in a cylindrical bore 16 provided therefor in said body member and axial stems 18a, 18b extending in opposite directions therefrom. The rearward stem 18a projects into the hammer in position to be impactable by the striker or impact element thereof (not shown), and the other stem 18b extends axially-forwardly through an opening 20 provided therefor in the closed end of the body member 10 and terminates in a preferably rounded striking head 18c. A retaining screw 22 threaded into the tubular wall of the body member adjacent its forward end depends into the body member opening 20 through which the stem 18b passes and terminates in a key-like end operative in an axial slot 22a provided in the periphery of said stem, thus serving to maintain the plunger 12 as a whole against turning, and by its engagement with the slot ends also serving as a limit stop for the plunger in its movement in both directions.

Rigidly affixed to and extending forwardly-upwardly from the lower front end of the body member 10 in a plane which intersects the longitudinal axis of said body member is a foot plate 24 which is adapted to be placed against the workpiece to be cut, thereby serving as a tool rest and/or steadying means, the foot plate having an elongated cutting-blade slot 26 and being also provided in its front edge with a centrally disposed sighting notch 28 which aids the operator to guide the tool along a predetermined line of cut. Any other appropriate tool sighting and/or guiding means may of course be substituted for the aforesaid notch 28.

Supported above the foot plate 24 for forward and rearward pivotal movement in its plane is a preferably flat, substantially parallel-sided cutting blade 30 whose configuration in side elevation is best seen in FIG. 3. To provide for such movement, the blade is mounted to depend in a plane which intersects the longitudinal axis of said body member 10 from a transverse pivot pin 32 extending between the bifurcated bracket arms 34a, 34b, which are spaced to receive said blade and are affixed at their rearward ends to the body member 10 so as to extend forwardly therefrom. In addition to providing for pivotal motion of the blade, the pivot pin 32 also supports the cutting blade 30 at an elevation such that its lower forward corner, as defined by the junction of the then forward side edge and its bottom edge, extends through the foot-plate slot 26 as said cutting blade partakes of its swinging movement.

It is a further feature of the invention that both side edges of the cutting blade, or at least the lower portions thereof designated 30a, 30b which are adapted to operate in the foot-plate slot, are ground to function as cutting edges, and also that the blade-mounting pin 32 is secured to the bifurcated bracket arms 34a, 34b as by simple, readily removable means such as the cotter pins 36a, 36b. Such arrangement permits the blade 30 to be readily removed and reversed if and when desired, which is a feature of advantage to the owner or operator of the tool in the event that one cutting edge of the blade is broken off or becomes dulled in use.

By reference to FIG. 3, it will also be seen that the ground cutting edges 30a, 30b of the blade are formed outwardly concave. Such a cutting edge formation, in conjunction with the feature of the cutting blade operating through the slot in a foot plate which is positioned directly against the workpiece being cut, results in the strip of scrap which is cut away from the metal sheet or panel constituting said workpiece curling downwardly therefrom as generally illustrated in FIG. 1, rather than upwardly from the workpiece as is usual. Thus, the workpiece itself serves to protect the operator of the tool from the scrap being thrown or otherwise moving upwardly in his direction.

As will be understood from FIG. 3, the aforesaid cutting blade 30 is disposed in line with and in the path of reciprocation of the plunger stem 18b and accordingly the striking end 18c of said stem will impact the side edge of the blade which is nearest to it with each impact applied by the hammer H. That is to say, the plunger 14 as a whole serves to transmit the high frequency impacts applied thereto by the hammer H to the cutting blade 30. Since said cutting blade is entirely free to rebound relatively rearwardly or away from the workpiece following each hammer blow or impact applied thereto, the action of the cutting blade 30, upon the tool being placed in operation, is to swing back and forth at the high frequency at which the impact blows are applied to it throughout a limited arc and on each forward swing or stroke to cut through the workpiece against which the foot plate is placed.

Normally, the cut to be made in a metal strip or panel constituting the workpiece is started by any suitable means, but once the tool of the invention is placed against the workpiece with the cutting blade thereof registered in the starting cut, the operator thereafter need only guide the tool along the predetermined line of cut, since the impact hammer H supplies the actual shearing or cutting force to the blade via the plunger 14. Accordingly, a tool of the invention greatly simplifies the operation of making straight line and/or curled cuts in metal sheets and panels, with the minimum amount of time and effort on the part of the operator.

Without further analysis, it will be appreciated that a metal cutting tool as illustrated and described herein achieves the objectives of the invention as explained in the foregoing, and more particularly provides a highly practical and thoroughly dependable cutting tool for use in cutting the metal sheets and panels. However, minor structural changes may be made in the herein tool without departing from the spirit and principle of the invention. For example, the bifurcated bracket arms in which the pivot pin 32 is journaled may be affixed to the foot-plate 24 to extend upwardly therefrom rather than extending from the body member 10. Also, the construction of the plunger 12 may vary from that shown. Thus, it is to be understood that all matter contained in the above description or shown in the accompanying drawings shall be interpreted as illustrative and not in a limiting sense.

I claim:

1. A sheet-metal cutting tool comprising a tubular body member adapted to be attached at its relatively rearward end to a power-operated impact hammer, a workpiece engaging foot plate affixed to and extending forwardly from said body member and having a longitudinal cutting-blade slot provided therein, a cutting blade pivotally connected to said body member forwardly thereof for limited forward and reverse swinging movement in its plane about an axis which extends transversely across said foot plate and at a level thereabove which is such that the lower portion of one side edge of said blade protrudes through the slot, at least said lower portion of said side edge being ground to form a cutting edge, and impact-transmitting means mounted in said body member for reciprocatory movement and extending forwardly therefrom to a position in which it is adapted to impact the other side edge of said cutting blade, the construction and arrangement being such that said cutting blade is free to rebound from a workpiece following each impact applied thereto by said impact-transmitting means.

2. A sheet-metal cutting tool substantially as defined in claim 1, wherein at least said lower portion of said side edge is formed concave, being thereby operative in conjunction with the foot plate to roll the scrap resulting from the cut downwardly from the workpiece.

3. A sheet-metal cutting tool substantially as defined in claim 1, wherein the lower portions of both side edges of the cutting blade are ground and said blade is bodily reversible so that either ground edge may serve as the tool cutting edge.

4. A sheet-metal cutting tool substantially as defined in claim 3, wherein said ground cutting-edge portions are formed concave, whereby the blade in conjunction with the foot plate is operative to roll the scrap resulting from the cut downwardly from the workpiece.

5. A sheet-metal cutting tool substantially as defined in claim 1, wherein said impact-transmitting means comprises a plunger operative within said tubular body member and having a stem portion extending therefrom through said body member into direct engagement with the cutting blade.

6. A sheet-metal cutting tool substantially as defined in claim 1, wherein the forward edge of the foot plate is provided with a centrally disposed sighting notch disposed in longitudinal alignment with the path of swinging motion of the cutting blade, said sighting notch facilitating guiding of the tool along a projected line of cut.

7. A sheet metal cutting tool substantially as defined in claim 1, wherein said foot plate inclines forwardly-upwardly from the forward lower end of said tubular body member in a plane which intersects the longitudinal axis of said body member.

8. A sheet metal tool substantially as defined in claim 7, wherein the axis of swinging movement of the cutting blade is disposed above said foot plate and said foot plate depends therefrom in a plane which extends through said longitudinal axis and operates within the slot provided therefor in said footplate.

No references cited.